US009151264B2

(12) United States Patent
Nakamura et al.

(10) Patent No.: US 9,151,264 B2
(45) Date of Patent: Oct. 6, 2015

(54) IGNITION TIMING CONTROLLING APPARATUS FOR ENGINE, AND VEHICLE INCORPORATING THE SAME

(75) Inventors: Masanori Nakamura, Saitama (JP); Takeru Abe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 386 days.

(21) Appl. No.: 13/614,357

(22) Filed: Sep. 13, 2012

(65) Prior Publication Data

US 2013/0081596 A1    Apr. 4, 2013

(30) Foreign Application Priority Data

Sep. 29, 2011    (JP) .................................. 2011-213735

(51) Int. Cl.
*F02P 5/15*    (2006.01)

(52) U.S. Cl.
CPC .............. *F02P 5/1502* (2013.01); *F02P 5/1512* (2013.01); *F02P 5/1504* (2013.01); *Y02T 10/46* (2013.01)

(58) Field of Classification Search
CPC .............. F02D 41/3064; F02D 41/307; F02D 41/4076; F02P 5/02; F02P 5/04; F02P 5/145; F02P 5/15; F02P 5/152; F02P 5/1521; F02P 5/1523; F02P 5/16
USPC .......... 701/103, 105, 110; 123/406.2, 406.22, 123/406.24, 406.25, 406.5, 406.51, 406.52, 123/406.53, 406.54, 406.46; 477/90, 100, 477/102
See application file for complete search history.

(56) References Cited

U.S. PATENT DOCUMENTS

| 3,272,191 | A | * | 9/1966 | Walker ..................... 123/406.69 |
| 3,584,521 | A | * | 6/1971 | Tooker et al. ................ 477/100 |
| 3,871,341 | A | * | 3/1975 | Kalogerson et al. ...... 123/406.55 |
| 3,896,913 | A | * | 7/1975 | Maruoka et al. ................ 477/90 |
| 4,016,844 | A | * | 4/1977 | Tanaka et al. ................ 477/203 |
| 4,085,715 | A | * | 4/1978 | Otaka ....................... 123/406.69 |
| 4,158,349 | A | * | 6/1979 | Goto et al. ................. 123/406.7 |
| 4,924,832 | A | * | 5/1990 | Abe ............................. 477/102 |
| 5,058,550 | A | * | 10/1991 | Nagano et al. ............ 123/406.46 |
| 5,123,389 | A | * | 6/1992 | Togai et al. .................... 123/399 |
| 5,884,605 | A | * | 3/1999 | Nagaishi et al. ......... 123/339.11 |

(Continued)

FOREIGN PATENT DOCUMENTS

| JP | S59188057 A | 10/1984 |
| JP | H07119602 A | 5/1995 |
| JP | H0842375 A | 2/1996 |
| JP | H09236033 A | 9/1997 |

(Continued)

*Primary Examiner* — Stephen K Cronin
*Assistant Examiner* — Susan E Scharpf
(74) *Attorney, Agent, or Firm* — Carrier Blackman & Associates, P.C.; Joseph P. Carrier; Anne G. Sabourin

(57) ABSTRACT

An ignition timing controlling apparatus for an engine includes an ignition timing map in which high-torque timings are stored, an ECU for changing a high-torque timing obtained from the ignition timing map into a fuel-conserving ignition timing, and an advance angle target amount map in which advance angle target amounts with which the high-torque timing is to be changed into the fuel-conserving ignition timing are stored. The ECU is operable to calculate an advance angle target amount for each of cylinders of the engine based on the advance angle target amount map when a running state of a vehicle is in a cruize state in which little acceleration or deceleration is included, and also to execute advance angle control of changing the ignition timing of each of the cylinders stepwise with respect to the advance angle target amount for each of the cylinders.

18 Claims, 12 Drawing Sheets

(56) References Cited

U.S. PATENT DOCUMENTS

| | | | |
|---|---|---|---|
| 6,388,446 B1 * | 5/2002 | Nielsen et al. | 324/391 |
| 6,772,731 B2 | 8/2004 | Miura | |
| 7,296,556 B2 * | 11/2007 | Yamaguchi et al. | 123/305 |
| 7,526,375 B2 * | 4/2009 | Buslepp et al. | 701/112 |
| 7,757,661 B2 * | 7/2010 | Tamamoto | 123/406.54 |

FOREIGN PATENT DOCUMENTS

| | | |
|---|---|---|
| JP | H10159628 A | 6/1998 |
| JP | 2000087835 A | 3/2000 |
| JP | 2003328792 A | 11/2003 |
| JP | 2006-226131 A | 8/2006 |
| JP | 2011047326 A | 3/2011 |

* cited by examiner

IGNITION TIMING CONTROLLING APPARATUS FOR ENGINE, AND VEHICLE INCORPORATING THE SAME

CROSS-REFERENCE TO RELATED APPLICATIONS

The present invention claims priority under 35 USC 119 based on Japanese patent application No. 2011-213735, filed on Sep. 29, 2011. The entire subject matter of this priority document, including specification claims and drawings thereof, is incorporated by reference herein.

BACKGROUND OF THE INVENTION

1. Field of the Invention

The present invention relates to an ignition timing controlling apparatus for an engine and to a vehicle incorporating the same. More particularly, the present invention relates to an ignition timing controlling apparatus which changes over an ignition timing of the engine between a torque-valuing ignition timing and a fuel-conserving ignition timing, and to a vehicle incorporating the same.

2. Description of the Background Art

The Japanese Patent Laid-Open No. 2006-226131 discloses a controlling technique for suppressing, in a power outputting apparatus which changes over an operation line for setting an operation point of an engine between an optimum fuel consumption line and a torque priority line for higher torque with respect to a rotary speed than the optimum fuel consumption line to set an operation point of the engine, a sense of incongruity provided to a driver by an increase of the engine speed when the operation line is changed over from the torque priority line to the optimum fuel consumption line.

However, in the Japanese Patent Laid-Open No. 2006-226131, the operation line is changed over between the torque priority line and the optimum fuel consumption line so as not to provide a sense of incongruity to the driver. However, it is not disclosed to carry out such control that a good running state is obtained in a transitional state during changeover of the operation line.

Therefore, it is one of the objects of the present invention to provide an ignition timing controlling apparatus for an engine which controls the ignition timing of an engine so as to prevent degradation of drivability in a transitional state upon changeover between a torque-valuing ignition timing and a fuel-conserving ignition timing to achieve a good running state.

SUMMARY OF THE INVENTION

In order to achieve the above objects, the present invention according to a first aspect thereof provides an ignition timing controlling apparatus (100) for an engine (22). The ignition timing controlling apparatus includes an ignition timing map (130) in which torque-valuing ignition timings are stored, an ignition timing correction unit (106) for changing a torque-valuing ignition timing obtained from the ignition timing map (130) into a fuel-conserving ignition timing, and an advance angle target amount map (134) in which advance angle target amounts with which the torque-valuing ignition timing is to be changed into the fuel-conserving ignition timing are stored. The ignition timing correction unit (106) calculates, when it is determined that a running state of a vehicle is placed into a cruise state in which little acceleration or deceleration is included, an advance angle target amount for each of cylinders (46) of the engine (22) based on the advance angle target amount map (134), and further executes advance angle control of changing the ignition timing of each of the cylinders (46) stepwise with respect to the advance angle target amount for each of the cylinders (46).

The present invention according to a second aspect thereof, in addition to the first aspect, is characterized in that the advance angle control by the ignition timing correction unit (106) advances the ignition timing for each of the cylinders (46) by an advance angle transition amount every time in a fixed cycle until the torque-valuing ignition timing for each of the cylinders (46) is advanced to the advance angle target amount for each of the cylinders (46).

The present invention according to a third aspect thereof, in addition to the second aspect, is characterized in that the advance angle control by the ignition timing correction unit (106) advances the torque-valuing ignition timing for each of the cylinders (46) by the advance angle transition amount every time the fixed cycle elapses, and when the advance angle amount of each of the cylinders (46) exceeds the advance angle target amount, the advance angle amount for each of the cylinders (46) is limited to the advance angle target amount.

The present invention according to a fourth aspect thereof, in addition to one of the first through third aspects, is characterized in that when the running state of the vehicle is taken out of the cruise state, the ignition timing correction unit (106) retards the ignition timing for each of the cylinders (46) of the engine (22) stepwise to return the ignition timing to the torque-valuing ignition timing.

The present invention according to a fifth aspect thereof, in addition to the fourth aspect, is characterized in that the returning control by the ignition timing correction unit (106) retards the ignition timing for each of the cylinders (46) by a retard angle transition amount every time in a fixed cycle until the ignition timing for each of the cylinders (46) is returned to the torque-valuing ignition timing.

The present invention according to a sixth aspect thereof, in addition to one of the second, third and fifth aspects, is characterized in that the advance angle transition amount and the retard angle transition amount are determined in response to an engine speed in advance.

The present invention according to a seventh aspect thereof, in addition to the sixth aspect, is characterized in that the advance angle transition amount and the retard angle transition amount are set so as to increase as the engine speed increases.

Effects of the Invention

According to the first aspect of the present invention, if a cruise state is entered, then the ignition timing of each cylinder is advanced stepwise until the torque-valuing ignition timing is advanced to a fuel-conserving ignition timing. Therefore, the output power variation of the cylinders and the engine in a transition state is moderated, and transition of the ignition timings becomes favorable. In addition, the drivability does not degrade and the running state becomes favorable, and the ignition timing can be changed without providing a sense of incongruity to the driver.

Further, since an advance angle target amount is obtained for each cylinder of the engine, even if the deviation between the torque-valuing ignition timing and the fuel-conserving ignition timing differs among the cylinders, the ignition timings can be controlled favorably, and the output power variation of the cylinders and the engine in a transition state is moderated and the drivability does not degrade. Accordingly, the running state becomes favorable, and the ignition timing can be changed without providing a sense of incongruity to the driver.

According to the second aspect of the present invention, since the ignition timing for each cylinder is advanced by a fixed amount in a fixed cycle, the output power variation of the cylinders and the engine in a transition state upon changeover from the torque-valuing ignition timing to the fuel-conserving ignition timing becomes linear.

According to the third aspect of the present invention, the torque-valuing ignition timing for each of the cylinders is advanced by the advance angle transition amount every time the fixed cycle elapses and, when the advance angle amount of each of the cylinders exceeds the advance angle target amount, the advance angle amount for the cylinders is limited to the advance angle target amount. Therefore, the ignition timing can be gradually advanced until the ignition timing finally becomes the fuel-conserving ignition timing.

According to the fourth aspect of the present invention, when the running state of the vehicle is taken out of the cruise state, the ignition timing for each of the cylinders of the engine is retarded stepwise every time the fixed cycle elapses to execute the returning control of returning the ignition timing to the torque-valuing ignition timing. Therefore, the output power variation of the cylinders and the engine in a transition state is moderated and the drivability does not degrade. Consequently, the running state becomes favorable, and the ignition timing can be changed without providing a sense of incongruity to the driver.

According to the fifth aspect of the present invention, the ignition timing for each of the cylinders is retarded by a fixed amount in a fixed cycle. Therefore, the output power variation of the cylinders and the engine in a transition state upon changeover from the fuel-conserving ignition timing to the torque-valuing ignition timing becomes linear.

According to the sixth and seventh aspects of the present invention, since the advance angle transition amount and the retard angle transition amount are determined in response to an engine speed, the ignition timing can be advanced and retarded appropriately in response to the engine speed.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An ignition timing controlling apparatus for an engine according to the present invention is described in detail below in connection with an illustrative embodiment thereof with reference to the accompanying drawings.

Figure 1:
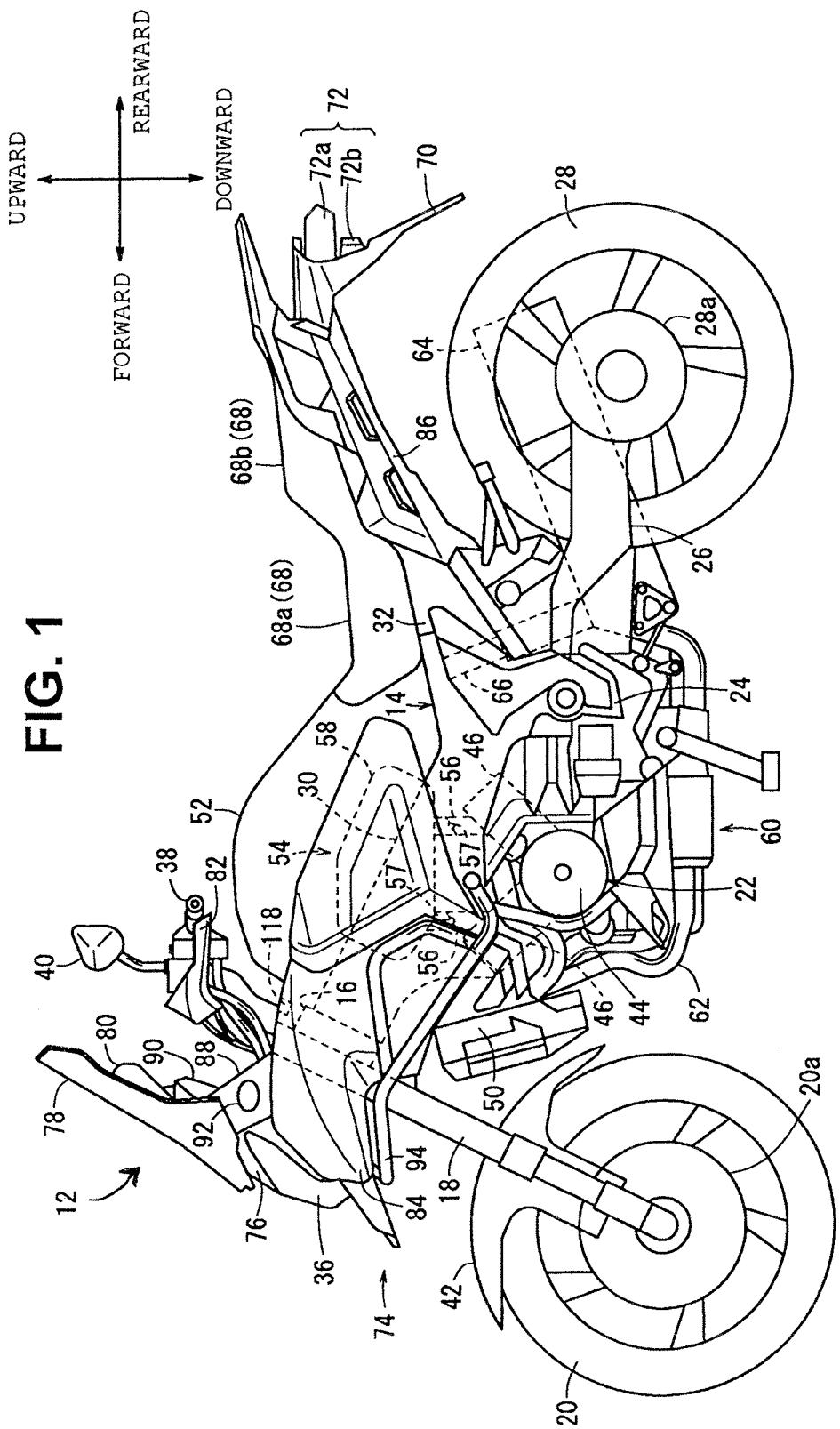
FIG. 1 is a schematic side elevational view showing a saddle type motorcycle having an ignition timing controlling apparatus for an engine according to an illustrative embodiment of the present invention.

FIG. 1 is a schematic side elevational view showing a saddle type motorcycle (hereinafter referred to as a motorcycle) 12 having the ignition timing controlling apparatus for an engine according to the present embodiment. It may be noted that, in order to facilitate understandings of the present invention, unless otherwise specified, forward, backward and upward, downward directions are described with reference to the directions of arrow marks shown in FIG. 1 and leftward and rightward directions are described with reference to a direction as viewed from a driver seated on a vehicle body.

The motorcycle 12 includes a vehicle body frame 14 which configures a vehicle body, a pair of left and right front forks 18 supported for rotation on a head pipe 16 provided at a front end portion of the vehicle body frame 14, a front wheel (steering wheel) 20 attached to the front forks 18, an engine 22 supported on the vehicle body frame 14 and serving as a driving source for the motorcycle 12, a swing arm 26 supported for rocking motion at a pivot portion 24 at a lower portion of the vehicle body frame 14, and a rear wheel (driving wheel) 28 attached to a rear end portion of the swing arm 26.

The vehicle body frame 14 is configured, for example, from a tube frame formed by aluminum casting and having high rigidity. The vehicle body frame 14 has a pair of main frames 30 extending obliquely downwardly from the head pipe 16, the pivot portion 24 connected to a rear portion of the main frames 30 and extending downwardly, and a pair of left and right seat frames 32 attached to a rear portion of the main frames 30 and extending obliquely rearwardly upwards.

A headlamp 36 for irradiating forwardly of the vehicle body is provided forwardly of the head pipe 16. A handle bar 38 which can steer the front wheel 20 is attached above the head pipe 16. A pair of left and right back mirrors 40 is attached to the handle bar 38. A throttle grip (not shown) for indicating acceleration of the motorcycle 12 is provided on the right side of the handle bar 38.

The front wheel 20 is supported for rotation at a lower end portion of the front forks 18, and a brake apparatus (disk brake) 20a for applying braking force to the front wheel 20 is mounted on a side face of the front wheel 20. Further, a front fender 42 which covers the front wheel 20 from above is attached to a lower end portion of the front forks 18.

The engine 22, for example, is a water-cooled four-stroke V-type four-cylinder engine. The engine 22 includes a crankcase 44 disposed at a lower end portion thereof, and four cylinders 46, 46, 46, 46. Two of the four cylinders 46, 46, 46, 46 are provided on the left and right so as to extend obliquely forwardly upwards from the crankcase 44, and on the rear of the two cylinders 46, 46, the remaining two cylinders 46, 46 are provided on the left and right so as to extend obliquely rearwardly upwards. The engine 22 is secured and supported, at an intermediate portion thereof positioned between the cylinders 46, 46 provided obliquely forwardly and the cylinders 46, 46 provided obliquely rearwardly, to and by the main frames 30, and is secured and supported, at a rear portion thereof, to and by the pivot portion 24 such that the posture thereof is fixed.

An ignition plug (ignition apparatus) (not shown) for carrying out ignition and a piston (not shown) are accommodated inside each of the cylinders 46, 46, 46, 46. Meanwhile, a crankshaft (described herein) which is connected to the pistons through connecting rods is supported for rotation (not shown) inside of the crankcase 44. Rotary driving force of the engine 22 is transmitted to the rear wheel 28 through a drive shaft (not shown) which extends rearwardly from the crankcase 44.

A radiator 50 for radiating heat of the engine 22 is disposed forwardly of the engine 22. Further, a fuel tank 52 and an intake apparatus 54 are mounted above the engine 22. The intake apparatus 54 includes intake pipes 56, 56, 56, 56 connected to the cylinders 46, 46, 46, 46, and an air cleaner 58 connected to the intake pipes 56, 56, 56, 56. Throttle valves 57, 57, 57, 57 for adjusting the amount of air to be supplied to the cylinders 46, 46, 46, 46 are provided in the intake pipes 56. The throttle valves 57, 57, 57, 57 are adjusted in opening by a TBW (throttle by wire) method. The intake apparatus 54 removes dust and so forth from the take in air by means of the air cleaner 58 and supplies the air to the cylinders 46, 46, 46, 46 through the intake pipes 56, 56, 56, 56.

An exhaust apparatus 60 is provided at a lower portion of the engine 22. The exhaust apparatus 60 includes an exhaust tube 62 connected to the cylinders 46, 46, 46, 46 and extending rearwardly in such a manner as to bypass a lower portion of the crankcase 44, and an exhaust muffler 64 disposed on the right side of the rear wheel 28 in a communicating relationship with the exhaust tube 62, and has a function of exhausting exhaust gas from the engine 22.

The swing arm 26 extends substantially horizontally from the pivot portion 24 toward the rear, and the rear wheel 28 is supported for rotation at a rear end portion of the swing arm 26. A brake apparatus (disk brake) 28a for applying braking force to the rear wheel 28 is mounted on a side face of the rear wheel 28. A rear shock absorber 66 for elastically connecting the main frames 30 and the swing arm 26 to each other is attached to an upper portion of the swing arm 26. The rear shock absorber 66 has a function of absorbing vibrations upon running of the motorcycle 12.

A seat 68 on which occupants (a driver and a fellow passenger) are to be seated is disposed on the seat frames 32. For the seat 68, a tandem type seat is adopted which is formed from a front seat 68a on which the driver is to be seated and a rear seat 68b on which the fellow passenger is to be seated on the rear of the front seat 68a. Further, a rear fender 70 extending rearwardly and further extending obliquely downwards from the lower side of a rear portion of the rearwardly extending portion is attached to a rear portion of the seat frames 32. A tail lamp unit 72 is attached to the rear fender 70. A brake lamp 72a and a rear side winker lamp 72b are disposed on the tail lamp unit 72.

A vehicle body cover 74 which configures a design (appearance) of the vehicle body is attached to the motorcycle 12 such that it extends in the forward and backward direction of the vehicle body. The vehicle body cover 74 has a headlamp cover 76 for covering the periphery of the headlamp 36, a screen supporting cover 80 for supporting a screen 78 at an upper portion of the headlamp 36, a handle cover 82 which covers the handle bar 38 from forwardly, and a rear cowl 86 extending rearwardly upwardly together with a pair of left and right side cowls 84 extending in a rearward direction from the opposite side faces of the headlamp 36 and the seat frames 32 and covering the opposite side faces of the seat frames 32.

The vehicle body cover 74 includes a cowl support stay 88 for supporting the headlamp 36 and the screen supporting cover 80, and the cowl support stay 88 is secured to a front portion of the main frames 30. The cowl support stay 88 supports a meter unit 90 disposed on the rear side of the headlamp 36 and has front side winker lamps 92 attached to the opposite side faces thereof. Cowl guide pipes 94 extend forwardly from the side faces of the paired left and right main frames 30 bypassing the side cowls 84 and are connected to a lower portion of the headlamp cover 76.

Figure 2:
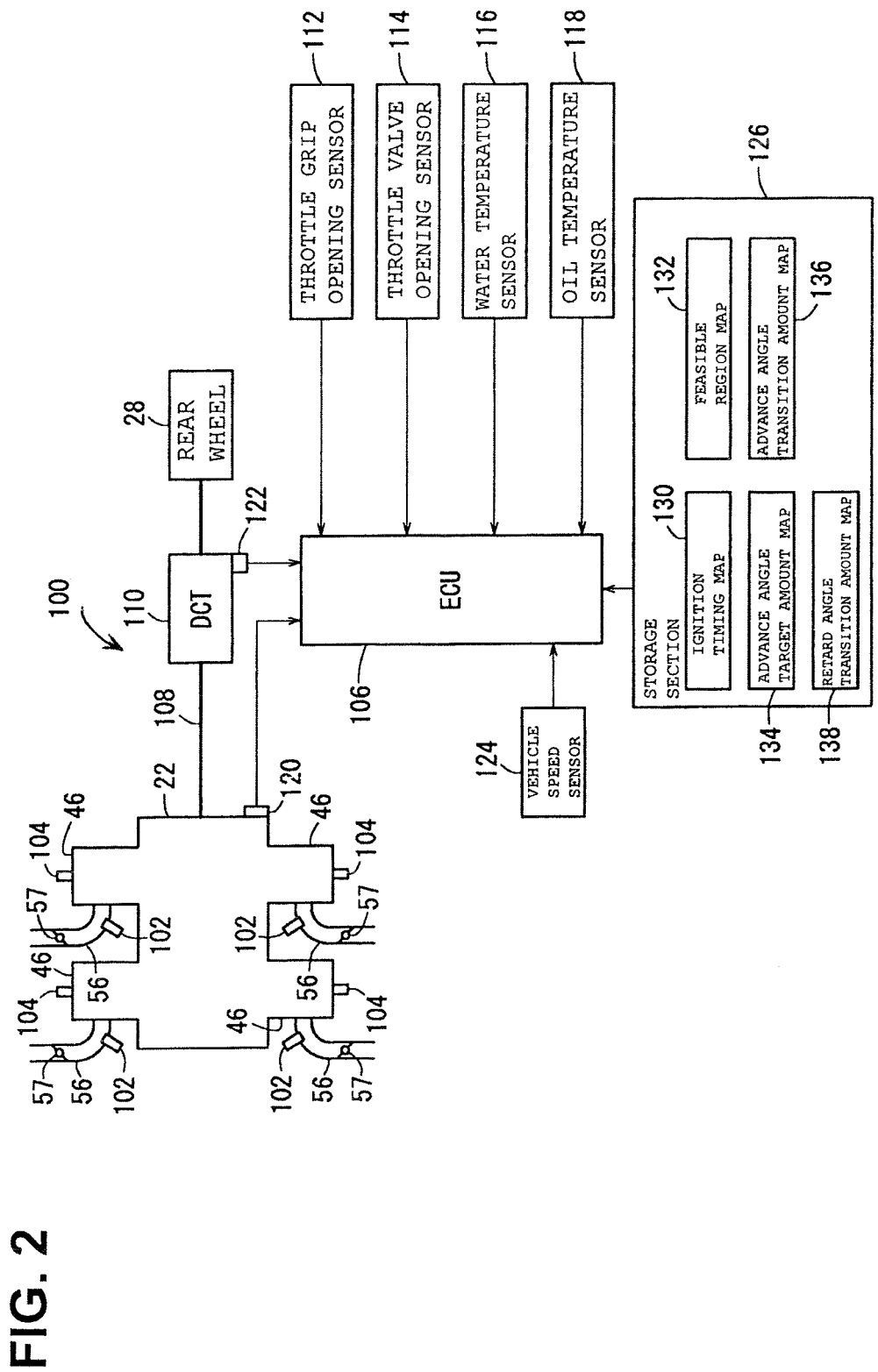
FIG. 2 is an electric schematic block diagram of the ignition timing controlling apparatus for an engine.

FIG. 2 is an electric schematic block diagram of an ignition timing controlling apparatus 100 for the engine 22. The ignition timing controlling apparatus 100 includes the V-type four-cylinder engine 22, the intake pipes 56, 56, 56, 56 connected to the cylinders 46, 46, 46, 46 and throttle valves 57, 57, 57, 57 provided in the intake pipes 56, 56, 56, 56, injectors (fuel injection apparatus) 102, 102, 102, 102 for injecting fuel in order to produce air fuel mixture to be taken into combustion chambers not shown of the cylinders 46, 46, 46, 46, and ignition plugs (ignition apparatus) 104, 104, 104, 104 for igniting the air fuel mixture in the combustion chambers. The air fuel mixture is mixture of air and fuel.

The injectors 102, 102, 102, 102 inject fuel into air taken in the combustion chambers of the cylinders 46, 46, 46, 46 through the throttle valves 57, 57, 57, 57 for adjusting the intake air amount to the combustion chambers to produce air fuel mixture. The produced air fuel mixture is fed into the combustion chambers and then ignited by the ignition plugs 104, 104, 104, 104 so as to be burnt, whereby the engine 22 converts the combustion energy into power.

The throttle valves 57, 57, 57, 57 are controlled by an ECU (control apparatus) 106 through a motor (not shown) so that the opening thereof is adjusted. The throttle valves 57, 57, 57, 57 are opened in response to the opening of the throttle grip described above. In the present embodiment, as the opening of the throttle valves 57, 57, 57, 57 increases, the output power of the engine 22 increases. The openings of the throttle valves 57, 57, 57, 57 are controlled so as to be equal to each other.

The fuel injection amount, injection timing and injection time period of the injectors 102, 102, 102, 102 and the ignition timing of the ignition plugs 104, 104, 104, 104 are controlled by the ECU 106.

A crankshaft 108 which is an output power shaft of the engine 22 is connected to the rear wheel 28 through a Dual Clutch Transmission (DCT) 110. The DCT 110 changes the speed of power to be transmitted to the rear wheel 28. More particularly, the DCT 110 is a transmission which carries out changeover between a gear set of odd-numbered stages (for example, a first speed gear stage, a third speed gear stage and a fifth speed gear stage) and a gear set of even-numbered stages (for example, a second speed gear stage, a fourth speed gear stage and a sixth speed gear stage) by means of two clutches and carries out speed change instantaneously by alternately connecting the two clutches.

For example, if the gear position connected at present is the third speed gear stage, then the second speed gear stage or the fourth speed gear stage is in a waiting state, and speed change can be carried out instantaneously by changing the connected clutch to the other clutch. By changing the gear stage to be connected, the transmission gear ratio of the DCT 110 changes. The first speed gear stage provides the highest transmission gear ratio while the sixth speed gear stage provides the lowest transmission gear ratio.

The ignition timing controlling apparatus 100 has a throttle grip opening sensor 112 for detecting the opening of the throttle grip, a throttle valve opening sensor 114 for detecting the opening of the throttle valves 57, 57, 57, 57, a water temperature sensor 116 for detecting the temperature of cooling water not shown of the engine 22, an oil temperature sensor 118 for detecting the temperature of lubricating oil of the engine 22 and the DCT 110, a rotary speed sensor 120 for detecting the rotary speed of the crankshaft 108 of the engine 22 (engine speed NE), a gear position sensor 122 for detecting the currently connected gear stage, and a vehicle speed sensor 124 for detecting the vehicle speed of the motorcycle 12. Signals detected by the throttle grip opening sensor 112, throttle valve opening sensor 114, water temperature sensor 116, oil temperature sensor 118, rotary speed sensor 120, gear position sensor 122 and vehicle speed sensor 124 are sent to the ECU 106. The sensors mentioned carry out the detection in a predetermined cycle, which may occur many times per second.

A storage section 126 has stored therein programs and data necessary for control of the ECU 106 and is used as a working memory of the ECU 106. Particularly, an ignition timing map 130, a feasible region map 132, an advance angle target amount map 134, an advance angle transition amount map 136 and a retard angle transition amount map 138 are stored in the storage section 126.

The ignition timing map 130 is a map in which torque-valuing ignition timings are stored. In particular, ignition timings of the cylinders 46, 46, 46, 46 corresponding to the engine speeds NE and intake air amounts to be taken into the cylinders 46, 46, 46, 46 are determined, and the ignition timing map 130 is provided for each of the cylinders 46, 46, 46, 46. The intake air amount depends upon the opening of the throttle valves 57, 57, 57, 57.

Figure 3:
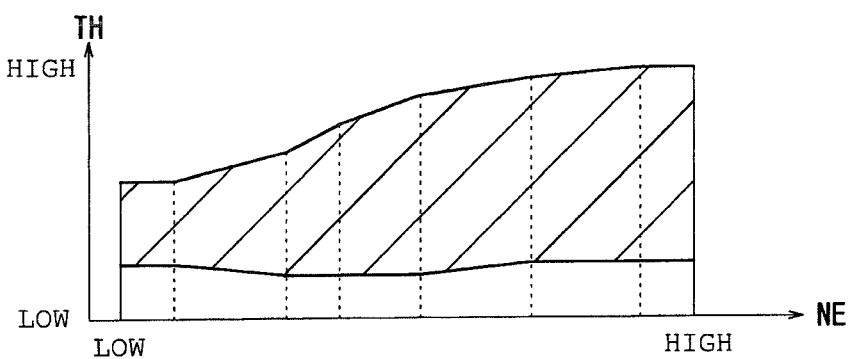
FIG. 3 is a view illustrating an example of a feasible region map.
Figure 4:
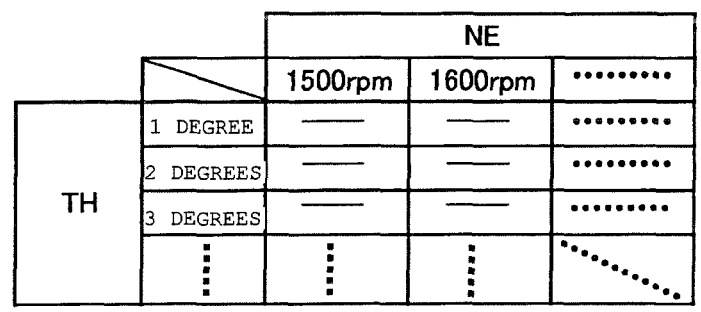
FIG. 4 is a view illustrating an example of an advance angle target amount map.

In the feasible region map 132, a feasible region in which execution of enhanced cruise control (advance angle control) hereinafter described is permitted is stored. As indicated by slanting lines in FIG. 3, the feasible region is defined by the engine speed NE and the opening of the throttle grip or the opening of the throttle valves 57, 57, 57, 57 (the opening of the throttle grip and the opening of the throttle valves 57, 57, 57, 57 are hereinafter referred to collectively as a throttle opening TH).

In the advance angle target amount map 134, advance angle target amounts for changing torque-valuing ignition timings to ignition timings MBT (Minimum Advance for Best Torque) in which the fuel consumption is valued and with which the torque is maximized are stored. The advance angle target amounts are defined in response to the throttle opening TH and the engine speed NE. The advance angle target amount map 134 is provided for each of the cylinders 46, 46, 46, 46.

Figure 5:
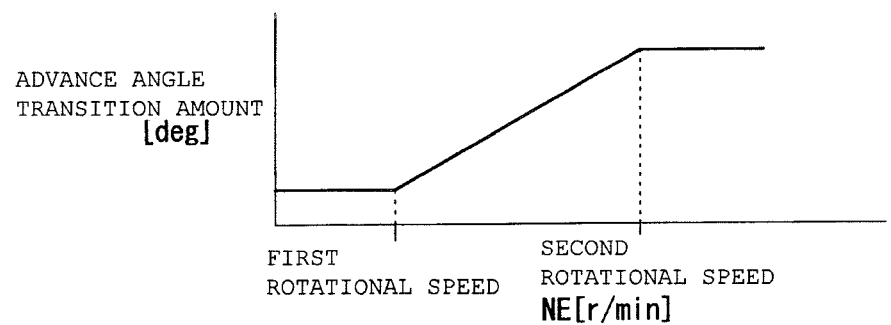
FIG. 5 is a view illustrating an example of an advance angle transition amount map.

In the advance angle transition amount map 136, advance angle transition amounts (fixed amounts) indicative of amounts by which the ignition timing is to be advanced by single time correction of the ignition timing are stored. The advance angle transition amounts are defined in response to the engine speed NE as seen in FIG. 5. The advance angle transition amounts are set such that the value thereof increases as the engine speed NE increases. In the present embodiment, a limiter is provided so that, when the engine speed NE is lower than a first rotary speed, the advance angle transition amount may not decrease any more. Similarly, another limiter is provided so that, when the engine speed NE is higher than a second rotary speed, the advance angle transition amount may not increase any more.

Figure 6:
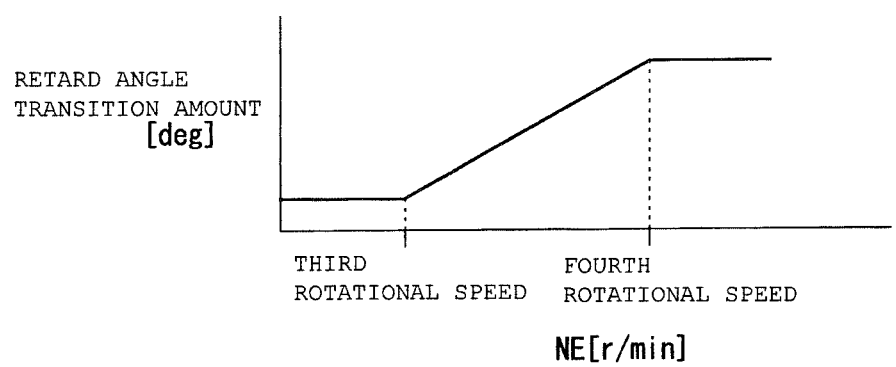
FIG. 6 is a view illustrating an example of a retard angle transition amount map.

In the retard angle transition amount map 138, retard angle transition amounts (fixed amounts) indicative of amounts by which the ignition timing is to be retarded by single time correction of the ignition timing are stored. The retard angle transition amounts are defined in response to the engine speed NE as seen in FIG. 6. The retard angle transition amounts are set such that the value thereof increases as the engine speed NE increases. In the present embodiment, a limiter is provided so that, when the engine speed NE is lower than a third rotary speed, the retard angle transition amount may not decrease any more. Similarly, another limiter is provided so that, when the engine speed NE is higher than a fourth rotary speed, the retard angle transition amount may not increase any more.

The ECU (ignition timing correction unit) 106 controls the opening of the throttle valves 57, 57, 57, 57 and the fuel injection amount and the injection timing of the injectors 102, 102, 102, 102 and further controls the ignition timing of the ignition plugs 104, 104, 104, 104 based on detection signals detected by the various sensors described hereinabove.

The ECU 106 corrects a torque-valuing ignition timing in response to a variation amount $\Delta TH$ of the throttle opening TH. In particular, the ECU 106 advances a torque-valuing ignition timing read out from the ignition timing map 130 in response to the magnitude of the variation amount $\Delta TH$ between the throttle opening TH at a timing preceding by a fixed period of time and the throttle opening TH at present (in response to the magnitude of the value obtained by subtracting the throttle opening TH at the timing preceding by the fixed period of time from the throttle opening TH at present) to correct the torque-valuing ignition timing. In the present embodiment, unless otherwise specified, the torque-valuing ignition timing may be an ignition timing read out from the ignition timing map 130 or may be a torque-valuing ignition timing changed in response to the magnitude of the variation amount $\Delta TH$.

Further, if the running state changes from an accelerated or decelerated state to a cruise state in which neither acceleration nor deceleration is carried out, then the ECU 106 carries out correction control (enhanced cruise control) of changing the torque-valuing ignition timing to an ignition timing MBT in which fuel conservation is maximized, and with which the torque is maximized (such ignition timing MBT is hereinafter referred to as fuel-conserving ignition timing MBT). In particular, the ECU 106 advances a torque-valuing ignition timing to an advance angle target amount to correct the torque-valuing ignition timing to a fuel-conserving ignition timing MBT.

At this time, if the ignition timing is changed from the torque-valuing ignition timing to the fuel-conserving ignition timing MBT at once, then this would give a sense of incongruity to the driver and the drivability would drop. Therefore, the ignition timing is advanced by an advance angle transition amount every time the fixed cycle elapses to advance the ignition timing gradually toward the advance angle target amount. At this time, the ECU 106 may vary the fuel injection amount to be injected by the injectors 102. The fuel injection amount injected by the injector 102 when air fuel mixture is exploded at the torque-valuing ignition timing is greater than the fuel injection amount when the air fuel mixture is ignited at the fuel-conserving ignition timing MBT. Further, as the ignition timing is advanced stepwise, the fuel injection amount is correspondingly decreased stepwise.

Similarly, also when the running state goes out from the cruise state (when the cruise state is interrupted and the running state returns to the state in which acceleration or deceleration is carried out), if the ignition timing is returned from the fuel-conserving ignition timing MBT to the torque-valuing ignition timing at once, then a sense of incongruity would be provided to the driver and the drivability would degrade.

Therefore, returning control of retarding the ignition timing by a retard angle transition amount every time the fixed cycle elapses to return the ignition timing gradually to the torque-valuing ignition timing is carried out. At this time, the ECU 106 may change the fuel injection amount to be injected by the injector 102. As the ignition timing is retarded stepwise, the fuel injection amount is increased stepwise.

Now, operation of the ignition timing controlling apparatus 100 is described with reference to a flow chart of FIG. 7.

At step S1, the ECU 106 carries out a cruise condition decision process discussed hereinabove. Then at step S2, the ECU 106 carries out an ignition timing correction controlling process (discussed hereinafter). The operation illustrated in the flow chart of FIG. 7 is carried out in a fixed cycle of a predetermined duration. The fixed cycle has a length at least equal to or greater than the predetermined cycle described hereinabove.

Figure 7:
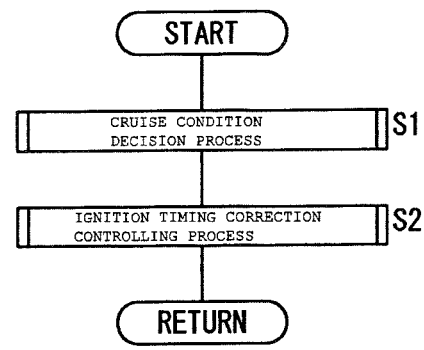
FIG. 7 is a flow chart illustrating operation of the ignition timing controlling apparatus.
Figure 8:
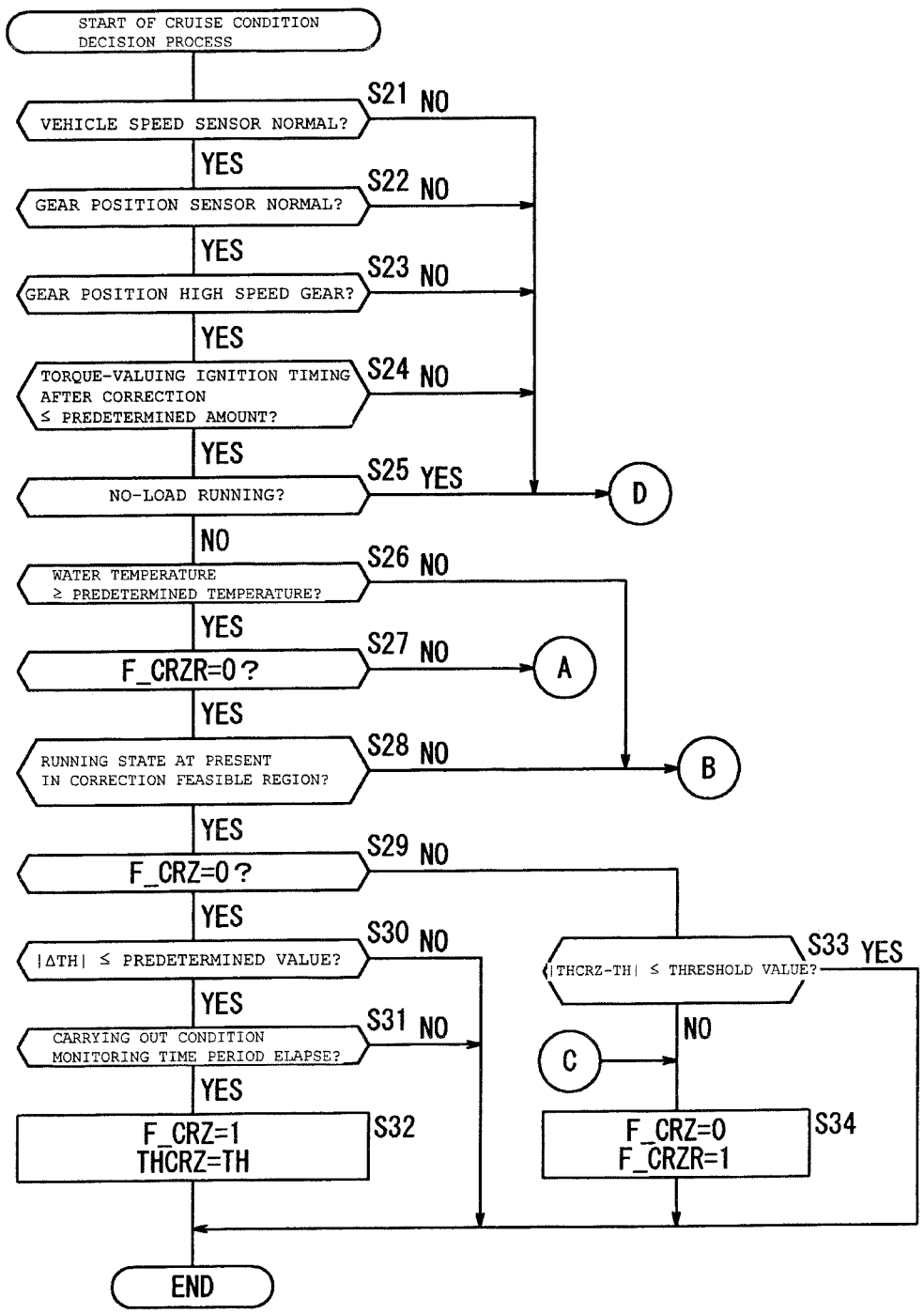
FIG. 8 is a sub-flow chart illustrating operation of a cruise condition decision process of FIG. 7.

First, the cruise condition decision process at step S1 of FIG. 7 is described. After the cruise condition decision process is started, the processing advances to step S21 of FIG. 8, at which the ECU 106 determines whether or not the vehicle speed sensor 124 is normal. If it is determined at step S21 that the vehicle speed sensor 124 is normal, then the ECU 106 determines whether or not the gear position sensor 122 is normal (step S22).

If it is determined at step S22 that the gear position sensor 122 is normal, then the ECU 106 determines whether or not the gear position connected at present is a high speed gear stage (step S23). This decision is made based on a gear stage detected by the gear position sensor 122. Here, if the gear stage connected at present is equal to or higher in speed than a predetermined gear stage (for example, the fourth speed gear stage), then the ECU 106 determines that the gear position connected at present is a high speed gear stage.

If it is determined at step S23 that the gear position connected at present is a high speed gear stage, then the ECU 106 determines whether or not the advance angle amount of the torque-valuing ignition timing read out from the ignition timing map 130 and changed in accordance with the variation amount ΔTH is equal to or smaller than a predetermined amount (step S24). In other words, the ECU 106 determines whether or not the torque-valuing timing changed in response to the variation amount ΔTH is in a state in which it does not advance by more than the predetermined amount. It is noted that high-torque timing is referred to in FIG. 8, at step S24, as torque-valuing ignition timing.

If it is determined at step S24 that the advance amount of the changed torque-valuing ignition timing is equal to or smaller than the predetermined amount (the ignition timing does not advance), then the ECU 106 determines whether or not the running state at present is a no-load running state (step S25). If a neutral stage is found, then the ECU 106 determines that the running state at present is a no-load running state. This decision is made based on the detection signals of the throttle grip opening sensor 112 and the gear position sensor 122. It may be noted that, also where the clutches (not shown) are in a disconnected state, the ECU 106 may determine that the running state at present is a no-load running state.

If it is determined at step S25 that the running state at present is not a no-load running state, then the ECU 106 determines whether or not the water temperature is equal to or higher than a predetermined temperature (step S26). Such decision is made based on the detection signal of the water temperature sensor 116. It may be noted that, at step S26, it may be determined whether or not the oil temperature is equal to or higher than a predetermined temperature in place of the water temperature, or whether or not the water temperature and the oil temperature are equal to or higher than the respective predetermined temperatures.

If it is determined at step S26 that the water temperature is equal to or higher than the predetermined temperature, then the ECU 106 determines whether or not a flag F_CRZR is equal to 0 (step S27). The flag F_CRZR is a flag indicative of whether or not returning control of returning the ignition timing from the fuel-conserving ignition timing MBT to the torque-valuing ignition timing is being executed (indicative of that the running state is being returned from a cruise state in which none of acceleration and deceleration is carried out to a state in which acceleration or deceleration is carried out), and when the returning control is being executed, the flag F_CRZR is 1. The value of the flag F_CRZR is stored in the storage section 126.

If it is determined at step S27 that the flag F_CRZR is equal to 0, then the ECU 106 determines whether or not the running state at present is within a feasible region in which execution of enhanced cruise control is to be permitted (step S28). In other words, the ECU 106 determines whether or not the engine speed NE and the throttle opening TH at present are included in the feasible region illustrated in the feasible region map 132 of FIG. 3.

If it is determined at step S28 that the running state at present is within the feasible region, then the ECU 106 determines whether or not a flag F_CRZ is equal to 0 (step S29). The flag F_CRZ is a flag indicative of whether or not the enhanced cruise control in which the torque-valuing ignition timing is changed to the fuel-conserving ignition timing MBT is being executed (indicative of that the running state is a cruise state), and when the enhanced cruise control is being executed, the flag F_CRZ is 1. The value of the flag F_CRZ is stored in the storage section 126.

If it is determined at step S29 that the flag F_CRZ is equal to 0, then the ECU 106 determines whether or not the absolute value of the variation amount ΔTH of the throttle opening TH is equal to or lower than a predetermined value (step S30). This is because, if the absolute value of the variation amount ΔTH of the throttle opening TH is not equal to or lower than the predetermined value, then the running state at present is a state in which acceleration or deceleration is being carried out and is not regarded as a cruise state.

If it is determined at step S30 that the absolute value of the variation amount ΔTH of the throttle opening TH is equal to or lower than the predetermined value, then the ECU 106 determines whether or not a carrying out condition monitoring time period elapses (step S31). In particular, the cruise condition decision process is carried out repetitively in a fixed cycle, and at step S31, it is determined whether or not it has been determined for more than the carrying out condition monitoring time period that the absolute value of the variation amount ΔTH of the throttle opening TH is equal to or lower than the predetermined value at step S30.

If it is determined at step S31 that the carrying out condition monitoring time period elapses, then the ECU 106 determines that the running state at present is a cruise state in which none of acceleration and deceleration is carried out, and sets the flag F_CRZ to 1 and sets the throttle opening TH at present to a reference throttle opening THCRZ (step S32), thereby ending the cruise condition decision process. By setting the flag F_CRZ to 1, the ECU 106 can recognize that the running state at present is a cruise state and the cruse advance control is being executed.

On the other hand, when it is determined at step S30 that the variation amount ΔTH of the throttle opening TH is not equal to or lower than the predetermined value, if it is determined at step S31 that the carrying out condition monitoring time period does not elapse, then the ECU 106 does not change the value of the flag F_CRZ and determines that the running state at present is not a cruise state in which none of acceleration and deceleration is carried out, thereby ending the cruise condition decision process.

If it is determined at step S29 that the flag F_CRZ is not equal to 0, that is, is equal to 1, then the ECU 106 determines whether or not the absolute value of a value obtained by subtracting the throttle opening TH at present from the reference throttle opening THCRZ is equal to or lower than a threshold value (step S33). At step S33, it is determined whether or not the cruise state in which none of acceleration and deceleration is carried out is being continuously carried out.

If it is determined at step S33 that the absolute value of the value obtained by subtracting the throttle opening TH at present from the reference throttle opening THCRZ is equal to or lower than the threshold value, then the cruise condition decision process is ended. However, if it is determined at step S33 that the absolute value of the value obtained by subtracting the throttle opening TH at present from the reference throttle opening THCRZ is not equal to or lower than the threshold value, then the ECU 106 clears the flag F_CRZ to 0 and sets the flag F_CRZR to 1 (step S34) and then ends the cruise condition decision process.

If the absolute value of the value obtained by subtracting the throttle opening TH at present from the reference throttle opening THCRZ is not equal to or lower than the threshold value, then the running state at present is not considered as a cruise state. Therefore, in order to return the running state from the cruise state to the state in which acceleration or deceleration is carried out, the flag F_CRZ is reset to 0 and the flag F_CRZR is set to 1. By setting the flag F_CRZR to 1, the ECU 106 can recognize that returning control is currently being executed.

Figure 9:
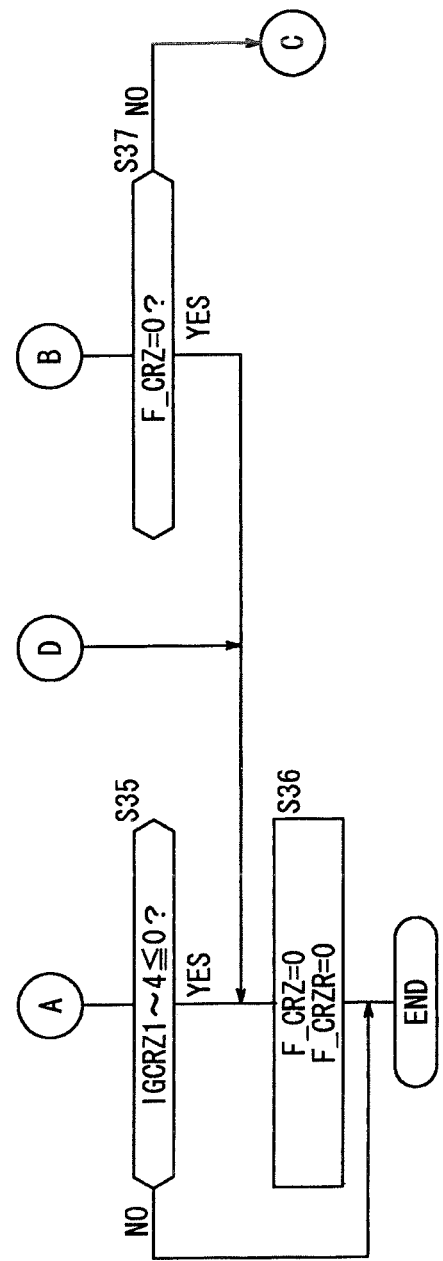
FIG. 9 is a sub-flow chart illustrating operation of the cruise condition decision process of FIG. 7.

If it is determined at step S27 that the flag F_CRZR is equal to 1, then the processing advances to step S35 of FIG. 9, at which the ECU 106 determines whether or not advance angle amounts of the ignition timing IGCRZ1 to IGCRZ4 at the cylinders 46, 46, 46, 46 are equal to or smaller than 0. The advance angle amount IGCRZ1 represents the advance angle amount of the ignition timing at the first cylinder 46; the advance angle amount IGCRZ2 represents the advance angle amount of the ignition timing at the second cylinder 46; the advance angle amount IGCRZ3 represents the advance angle amount of the ignition timing at the third cylinder 46; and the advance angle amount IGCRZ4 represents the advance angle amount of the ignition timing at the fourth cylinder 46.

When the advance angle amounts IGCRZ1 to IGCRZ4 are equal to or smaller than 0, the ignition timings of the cylinders 46, 46, 46, 46 do not have an advance angle, and this signifies that the ignition timing of the cylinders 46, 46, 46, 46 has returned to the torque-valuing ignition timing from the fuel-conserving ignition timing MBT. This signifies that the returning control is completed. The advance angle amounts IGCRZ1 to IGCRZ4 indicate by what amount the ignition timing of the cylinders 46, 46, 46, 46 advances from the torque-valuing ignition timing of the cylinders 46, 46, 46, 46.

If it is determined at step S35 that the advance angle amounts IGCRZ1 to IGCRZ4 are equal to or smaller than 0, then since the returning control is completed, the ECU 106 clears the flag F_CRZ to 0 and clears also the flag F_CRZR to 0 (step S36) and then ends the cruise condition decision process. On the other hand, if it is determined at step S35 that the advance angle amounts IGCRZ1 to IGCRZ4 are not equal to or smaller than 0, then the cruise condition decision process is ended without changing the value of the flag F_CRZ and the flag F_CRZR.

On the other hand, when it is determined at step S26 that the water temperature is not equal to or higher than the predetermined temperature, if it is determined at step S28 that the running state at present is not within the feasible region, then the processing advances to step S37 of FIG. 9, at which the ECU 106 determines whether or not the flag F_CRZ is equal to 0.

If the flag F_CRZ is equal to 1 at step S37 (if the running state at present is a cruise state and enhanced cruise control is being executed), then the processing advances to step S34, at which the ECU 106 clears the flag F_CRZ to 0 and sets the flag F_CRZR to 1, thereby ending the cruise condition decision process. When the flag F_CRZ is 1 and the running state at present is not included in the feasible region, the running state at present is not considered as a cruise state. Therefore, in order to return the running state from the cruise state to a state in which acceleration or deceleration is carried out, the flag F_CRZ is cleared to 0 and the flag F_CRZR is set to 1.

If the water temperature is not equal to or higher than the predetermined temperature and it is determined at step S37 that the flag F_CRZ is equal to 1, then the flag F_CRZ is cleared to 0 and the flag F_CRZR is set to 1 at step S34 to increase the fuel injection amount. Consequently, the water temperature can be prevented from dropping.

On the other hand, if the flag F_CRZ is equal to 0 at step S37 (if the running state at present is not a cruise state), then the processing advances to step S36, at which the flag F_CRZ is cleared to 0 and also the flag F_CRZR is cleared to 0, whereafter the cruise condition decision process is ended.

Meanwhile, when it is determined at step S21 that the vehicle speed sensor is not normal, when it is determined at step S22 that the gear position sensor is not normal, when it is determined at step S23 that the gear position is not a high speed gear stage, when it is determined at step S24 that the advance angle amount of the torque-valuing ignition timing after correction is not equal to or smaller than the predetermined amount or when it is determined at step S25 that the running state at present is no-load running, the processing advances to step S36 of FIG. 9, at which the flag F_CRZ is cleared to 0 and also the flag F_CRZR is cleared to 0. Thereafter, the cruise condition decision process is ended.

Now, the ignition timing correction controlling process at step S2 of FIG. 7 is described.

Figure 10:
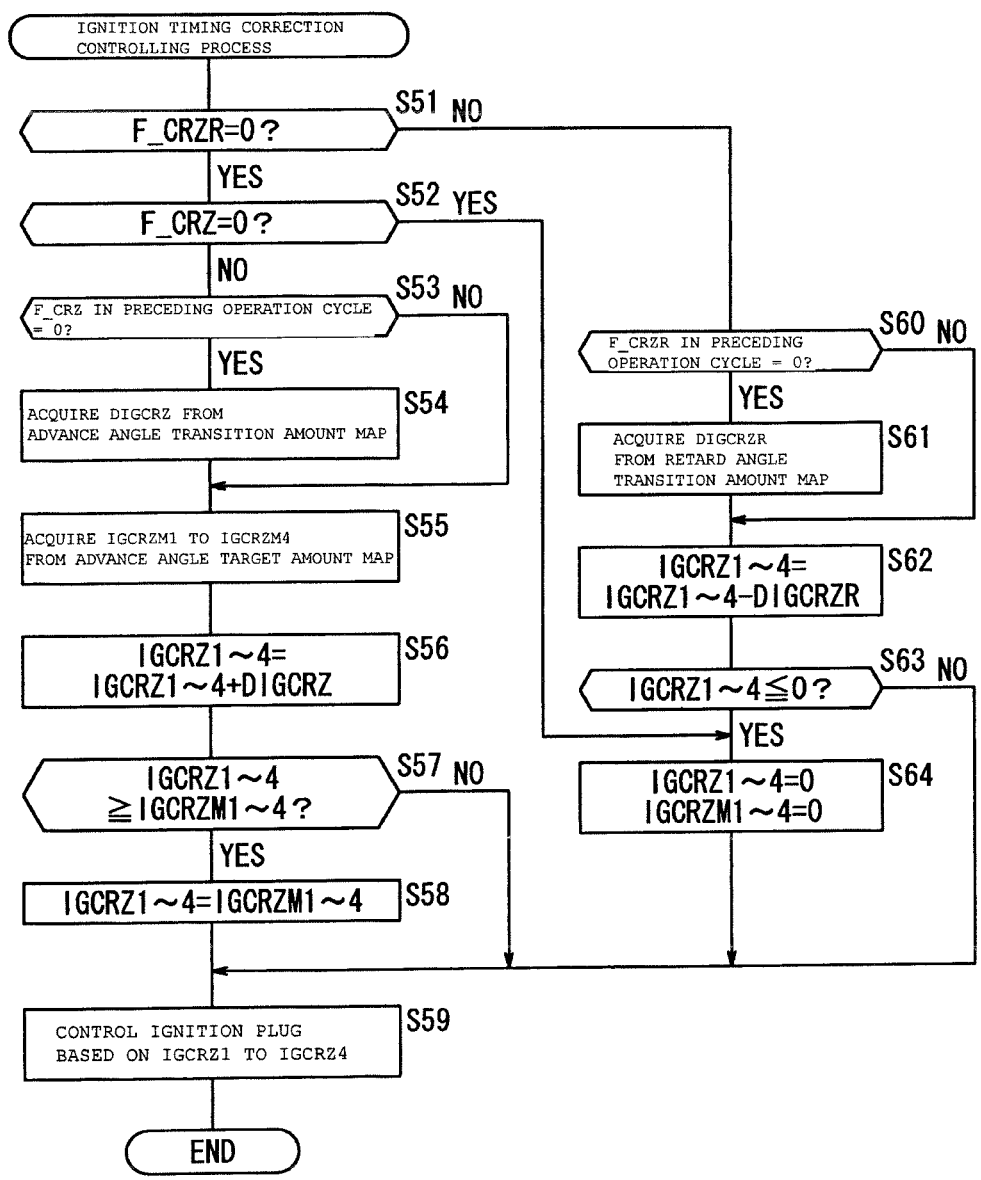
FIG. 10 is a sub-flow chart illustrating operation of an ignition timing correction controlling process of FIG. 7.

When the ignition timing correction controlling process is started, the processing advances to step S51 of FIG. 10, at which the ECU 106 determines whether or not the flag F_CRZR is equal to 0. In other words, it is determined at step S51 whether or not returning control of returning the ignition timing from the fuel-conserving ignition timing MBT to the torque-valuing ignition timing is being executed.

If it is determined at step S51 that the flag F_CRZR is equal to 0, then the ECU 106 determines that the returning control is not being executed and determines whether or not the flag F_CRZ is equal to 0 (step S52). In other words, at step S52, it is determined whether or not enhanced cruise control is being executed. If it is determined at step S52 that the flag F_CRZ is equal to 1, then the ECU 106 determines that enhanced cruise control is being executed and determines whether or not it was determined at step S52 in the preceding operation cycle that the flag F_CRZ was 0 (step S53). In other words, it is determined whether or not it was determined at step S52 in the preceding operation cycle that enhanced cruise control was being executed.

If it is determined at step S53 that the flag F_CRZ was determined to be equal to 1 at step S52 in the preceding operation cycle, then the processing advances directly to step S55. However, if it is determined at step S53 that the flag F_CRZ was determined to be equal to 0 at step S52 in the preceding operation cycle, then the ECU 106 acquires an advance angle transition amount DIGCRZ from the advance angle transition amount map 136 (step S54). Thereafter, the processing advances to step S55.

After the processing advances to step S55, the ECU 106 acquires advance angle target amounts IGCRZM1 to IGCRZM4 of the cylinders 46, 46, 46, 46 corresponding to the throttle opening TH and the engine speed NE at present from the advance angle target amount map 134. At step S55, the advance angle target amounts IGCRZM1 to IGCRZM4 of the cylinders 46, 46, 46, 46 are acquired from the advance angle target amount maps 134 provided for the individual cylinders 46, 46, 46, 46.

Here, the advance angle target amount IGCRZM1 is an advance angle target amount of the first cylinder 46; the advance angle target amount IGCRZM2 is an advance angle target amount of the second cylinder 46; the advance angle target amount IGCRZM3 is an advance angle target amount of the third cylinder 46; and the advance angle target amount IGCRZM4 is an advance angle target amount of the fourth cylinder 46.

Then, the ECU 106 determines values obtained by adding the advance angle transition amount DIGCRZ acquired at step S54 to the advance angle amounts IGCRZ1 to IGCRZ4 of the cylinders 46, 46, 46, 46 at present as new advance angle amounts IGCRZ1 to IGCRZ4 of the cylinders 46, 46, 46, 46 (step S56). In other words, advance angle amounts IGCRZ1 to IGCRZ4=advance angle amounts IGCRZ1 to IGCRZ4+advance angle transition amount DIGCRZ.

Here, the advance angle amount IGCRZ1 is an advance angle amount of the first cylinder 46; the advance angle amount IGCRZ2 is an advance angle amount of the second cylinder 46; the advance angle amount IGCRZ3 is an advance angle amount of the third cylinder 46; and the advance angle amount IGCRZ4 is an advance angle amount of the fourth cylinder 46.

Then, the ECU 106 determines whether or not the advance angle amounts IGCRZ1 to IGCRZ4 of the cylinders 46, 46, 46, 46 obtained at step S56 are equal to or greater than the advance angle target amounts IGCRZM1 to IGCRZM4 (step S57). In other words, it is determined whether the advance angle amount IGCRZ1 of the first cylinder 46 is equal to or greater than the advance angle target amount IGCRZM1; whether the advance angle amount IGCRZ2 of the second cylinder 46 is equal to or greater than the advance angle target amount IGCRZM2; whether the advance angle amount IGCRZ3 of the third cylinder 46 is equal to or greater than the advance angle target amount IGCRZM3; and whether the advance angle amount IGCRZ4 of the fourth cylinder 46 is equal to or greater than the advance angle target amount IGCRZM4.

If it is determined at step S57 that the obtained advance angle amounts IGCRZ1 to IGCRZ4 are equal to or greater than the advance angle target amounts IGCRZM1 to IGCRZM4, then the ECU 106 determines the advance angle amounts IGCRZ1 to IGCRZ4 as advance angle target amounts IGCRZM1 to IGCRZM4 (step S58) and then advances the processing to step S59. In other words, if the torque-valuing ignition timings of the cylinders 46, 46, 46, 46 are advanced to the advance angle target amounts IGCRZM1 to IGCRZM4, then since the fuel-conserving ignition timings MBT are obtained, the ignition timings of the cylinders 46, 46, 46, 46 need not be advanced from the advance angle target amounts IGCRZM1 to IGCRZM4.

However, if the advance angle amounts IGCRZ1 to IGCRZ4 are equal to or greater than the advance angle target amounts IGCRZM1 to IGCRZM4, then they are limited to the advance angle target amounts IGCRZM1 to IGCRZM4. It may be noted that, at step S57, only the advance angle amount IGCRZ of each of those cylinders 46 with regard to which it is determined that the advance angle amount IGCRZ is equal to or greater than the advance angle target amount IGCRZM is limited to the advance angle target amount IGCRZM.

On the other hand, if it is determined at step S57 that the advance angle amounts IGCRZ1 to IGCRZ4 of all cylinders 46, 46, 46, 46 obtained at step S56 are not equal to or greater than the advance angle target amounts, then the processing advances directly to step S59.

When the processing advances to step S59, the ECU 106 controls the ignition plugs 104, 104, 104, 104 of the cylinders 46, 46, 46, 46 so that ignition is carried out at ignition timings which are advanced by the advance angle amounts IGCRZ1 to IGCRZ4 at present from the torque-valuing ignition timings of the cylinders 46, 46, 46, 46. Thereafter, the ignition timing correction controlling process is ended.

The operations at steps S52 to S59 are operation of the enhanced cruise control of changing the torque-valuing ignition timing to the fuel-conserving ignition timing MBT.

It may be noted that the ECU 106 changes the fuel injection amounts to be injected by the injectors 102 in response to the advance angle amounts IGCRZ1 to IGCRZ4 of the cylinders 46, 46, 46, 46 at present. The fuel injection amounts depend upon the advance angle amounts IGCRZ1 to IGCRZ4 of the cylinders 46, 46, 46, 46 and decrease as the advance angle amounts IGCRZ1 to IGCRZ4 increase.

On the other hand, if it is determined at step S51 that the flag F_CRZR is equal to 1, then the ECU 106 determines that returning control is being carried out and determines whether or not it was determined at step S51 in the preceding operation cycle that the flag F_CRZR was equal to 0 (step S60). In other words, the ECU 106 determines whether or not it was determined at step S51 in the preceding operation cycle that returning control was being carried out.

If it is determined at step S60 that the flag F_CRZR was determined to be equal to 1 at step S51 in the preceding operation cycle, then the processing advances directly to step S62. However, if it is determined at step S60 that the flag F_CRZR was determined to be equal to 0 at step S51 in the preceding operation cycle, then the ECU 106 acquires a retard angle transition amount DIGCRZR from the retard angle transition amount map 138 (step S61), whereafter the processing advances to step S62.

After the processing advances to step S62, the ECU 106 determines values obtained by subtracting the retard angle transition amount DIGCRZR acquired at step S61 from the advance angle amounts IGCRZ1 to IGCRZ4 of the cylinders 46, 46, 46, 46 at present as new advance angle amounts IGCRZ1 to IGCRZ4 of the cylinders 46, 46, 46, 46. In other words, advance angle amounts IGCRZ1 to IGCRZ4=advance angle amounts IGCRZ1 to IGCRZ4−retard angle transition amount DIGCRZR.

Then, the ECU 106 determines whether or not the advance angle amounts IGCRZ1 to IGCRZ4 of the cylinders 46, 46, 46, 46 obtained at step S62 are equal to or smaller than 0 (step S63). If it is determined at step S63 that the advance angle amounts IGCRZ1 to IGCRZ4 of the cylinders 46, 46, 46, 46 are equal to or smaller than 0, then the ECU 106 sets the advance angle amounts IGCRZ1 to IGCRZ4 of the cylinders 46, 46, 46, 46 to 0 (step S64), whereafter the processing advances to step S59.

In other words, since only it is necessary to return the advanced ignition timings of the cylinders 46, 46, 46, 46 to the torque-valuing ignition timings, if the advance angle amounts IGCRZ1 to IGCRZ4 are equal to or smaller than 0, then they are limited to 0. It may be noted that, at step S64, the advance angle amount only of that or those ones of the cylinders 46, 46, 46, 46 with regard to which the corresponding one of the advance angle amounts IGCRZ1 to IGCRZ4 is determined to be equal to or smaller than 0 is limited to 0. Further, at step S64, also the advance angle target amounts IGCRZM1 to IGCRZM4 of the cylinders 46, 46, 46, 46 are changed to 0.

On the other hand, if it is determined at step S63 that all of the advance angle amounts IGCRZ1 to IGCRZ4 of the cylinders 46, 46, 46, 46 obtained at step S62 are not equal to or smaller than 0, then the processing advances directly to step S59.

After the processing advances to step S59, the ECU 106 controls the ignition plugs 104, 104, 104, 104 so that they carry out ignition at ignition timings obtained by advancing the torque-valuing ignition timings of the cylinders 46, 46, 46, 46 by the advance angle amounts IGCRZ1 to IGCRZ4 at present, thereby ending the ignition timing correction controlling process.

The operations at steps S60 to S64 and S59 are operations for the returning control of returning the fuel-conserving ignition timing MBT to the torque-valuing ignition timing.

It may be noted that the ECU 106 changes the fuel injection amounts to be injected by the injectors 102 in response to the advance angle amounts IGCRZ1 to IGCRZ4 of the cylinders 46, 46, 46, 46 at present. The fuel injection amounts depend upon the advance angle amounts IGCRZ1 to IGCRZ4 of the cylinders 46, 46, 46, 46, and the fuel injection amounts decrease as the advance angle amounts IGCRZ1 to IGCRZ4 increase.

Figure 11:
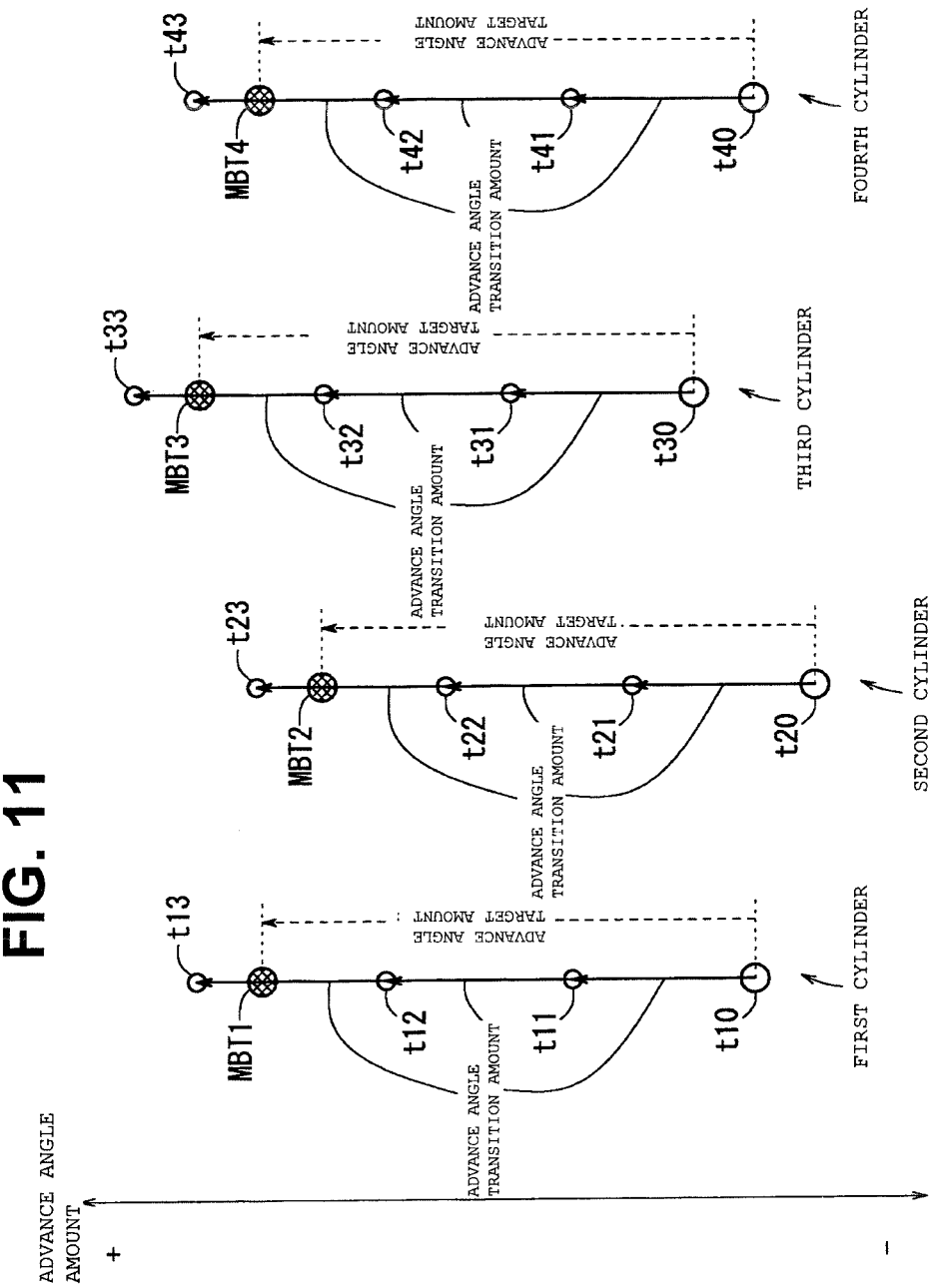
FIG. 11 is a view illustrating an ignition timing changed by enhanced cruise control.

FIG. 11 is a transition diagram of the ignition timing of the cylinders 46, 46, 46, 46 changed by the enhanced cruise control. Ignition timings t10, t20, t30 and t40 indicate torque-valuing ignition timings of the first cylinder 46, second cylinder 46, third cylinder 46 and fourth cylinder 46, respectively.

By the operation illustrated in the flow chart of FIG. 10 (steps S52 to S59) when it is carried out for the first time, the ignition timing of the first to fourth cylinders 46, 46, 46, 46 advances by the advance angle transition amount DIGCRZ. Consequently, the advance angle amounts IGCRZ1 to IGCRZ4 of the first to fourth cylinders 46, 46, 46, 46 become equal to the advance angle transition amount DIGCRZ, and the ignition timing of the first cylinder 46 changes from the ignition timing t10 to an ignition timing t11; the ignition timing of the second cylinder 46 changes from the ignition timing t20 to an ignition timing t21; the ignition timing of the third cylinder 46 changes from the ignition timing t30 to an ignition timing t31; and the ignition timing of the fourth cylinder 46 changes from the ignition timing t40 to an ignition timing t41.

When another cycle comes, by the operation illustrated in the flow chart of FIG. 10 (steps S52 to S59) when it is carried out for the second time, the ignition timing of the first to fourth cylinders 46, 46, 46, 46 further advances by the advance angle transition amount DIGCRZ. Consequently, the advance angle amounts IGCRZ1 to IGCRZ4 of the first to fourth cylinders 46, 46, 46, 46 become equal to the advance angle transition amount DIGCRZ×2, and the ignition timing of the first cylinder 46 changes from the ignition timing t11 to an ignition timing t12; the ignition timing of the second cylinder 46 changes from the ignition timing t21 to an ignition timing t22; the ignition timing of the third cylinder 46 changes from the ignition timing t31 to an ignition timing t32; and the ignition timing of the fourth cylinder 46 changes from the ignition timing t41 to an ignition timing t42.

Thereafter, a further cycle comes, and by the operation illustrated in the flow chart of FIG. 10 (steps S52 to S59) when it is carried out for the third time, the ignition timing of the first to fourth cylinders 46, 46, 46, 46 further advances by the advance angle transition amount DIGCRZ. Consequently, the advance angle amounts IGCRZ1 to IGCRZ4 of the first to fourth cylinders 46, 46, 46, 46 become equal to the advance angle transition amount DIGCRZ×3, and the ignition timing of the first cylinder 46 changes from the ignition timing t12 to an ignition timing t13; the ignition timing of the second cylinder 46 changes from the ignition timing t22 to an ignition timing t23; the ignition timing of the third cylinder 46 changes from the ignition timing t32 to an ignition timing t33; and the ignition timing of the fourth cylinder 46 changes from the ignition timing t42 to an ignition timing t43.

However, since the advance angle amount IGCRZ1 of the first cylinder 46 is equal to or greater than the advance angle target amount IGCRZM1 of the first cylinder 46, the advance angle amount IGCRZ1 of the first cylinder 46 is limited to the advance angle target amount IGCRZM1. Accordingly, the ignition timing of the first cylinder 46 becomes a fuel-conserving ignition timing MBT1.

Further, since the advance angle amount IGCRZ2 of the second cylinder 46 is equal to or greater than the advance angle target amount IGCRZM2 of the second cylinder 46, the advance angle amount IGCRZ2 of the second cylinder 46 is limited to the advance angle target amount IGCRZM2. Accordingly, the ignition timing of the second cylinder 46 becomes a fuel-conserving ignition timing MBT2.

Further, since the advance angle amount IGCRZ3 of the third cylinder 46 is equal to or greater than the advance angle target amount IGCRZM3 of the third cylinder 46, the advance angle amount IGCRZ3 of the third cylinder 46 is limited to the advance angle target amount IGCRZM3. Accordingly, the ignition timing of the third cylinder 46 becomes a fuel-conserving ignition timing MBT3.

Further, since the advance angle amount IGCRZ4 of the fourth cylinder 46 is equal to or greater than the advance angle target amount IGCRZM4 of the fourth cylinder 46, the advance angle amount IGCRZ4 of the fourth cylinder 46 is limited to the advance angle target amount IGCRZM4. Accordingly, the ignition timing of the fourth cylinder 46 becomes a fuel-conserving ignition timing MBT4.

In this manner, when the ignition timings of the cylinders 46, 46, 46, 46 are advanced by the advance angle transition amount DIGCRZ every time the fixed cycle elapses, if the advance angle amounts IGCRZ1 to IGCRZ4 of the cylinders 46, 46, 46, 46 become equal to or greater than the advance angle target amounts IGCRZM1 to IGCRZM4, then the advance angle amounts IGCRZ1 to IGCRZ4 of the cylinders 46, 46, 46, 46 are limited to the advance angle target amount IGCRZM.

Figure 12:
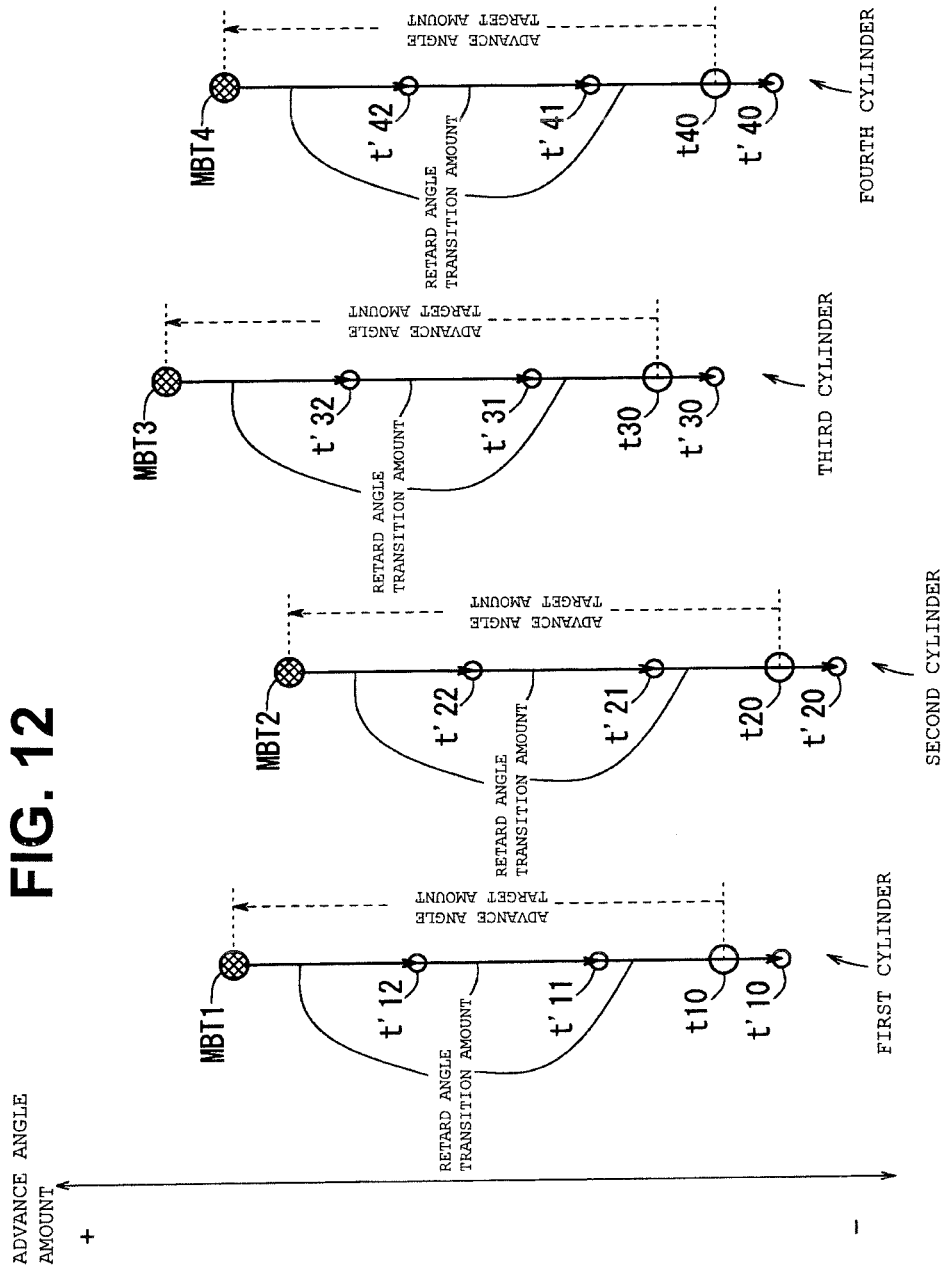
FIG. 12 is a view illustrating correction of an ignition timing changed by returning control.

FIG. 12 is a transition diagram of the ignition timings of the cylinders 46, 46, 46, 46 changed by the returning control.

By the operation illustrated in the flow chart of FIG. 10 (steps S60 to S64 and S59) when it is carried out for the first time, the ignition timing of the first to fourth cylinders 46, 46, 46, 46 retards by the retard angle transition amount DIGCRZR. Accordingly, the advance angle amounts IGCRZ1 to IGCRZ4 of the first to fourth cylinders 46, 46, 46, 46 become equal to the advance angle target amounts IGCRZM1 to IGCRZM4+retard angle transition amount DIGCRZR, and the ignition timing of the first cylinder 46 changes from the fuel-conserving ignition timing MBT1 to an ignition timing t'12; the ignition timing of the second cylinder 46 changes from the fuel-conserving ignition timing MBT2 to an ignition timing t'22; the ignition timing of the third cylinder 46 changes from the fuel-conserving ignition timing MBT3 to an ignition timing t'32; and the ignition timing of the fourth cylinder 46 changes from the fuel-conserving ignition timing MBT4 to the ignition timing t'42.

When another cycle comes, by the operation illustrated in the flow chart of FIG. 10 (steps S60 to S64 and S59) when it is carried out for the second time, the ignition timing of the first to fourth cylinders 46, 46, 46, 46 further retards by the retard angle transition amount DIGCRZR. Accordingly, the advance angle amounts IGCRZ1 to IGCRZ4 of the first to fourth cylinders 46, 46, 46, 46 become equal to the advance angle target amounts IGCRZM1 to IGCRZM4−(retard angle transition amount DIGCRZR×2), and the ignition timing of the first cylinder 46 changes from the ignition timing t'12 to an ignition timing t'11; the ignition timing of the second cylinder 46 changes from the ignition timing t'22 to an ignition timing t'21; the ignition timing of the third cylinder 46 changes from the ignition timing t'32 to an ignition timing t'31; and the ignition timing of the fourth cylinder 46 changes from the ignition timing t'42 to an ignition timing t'41.

Thereafter, a further cycle comes, and by the operation illustrated in the flow chart of FIG. 10 (steps S60 to S64 and S59) when it is carried out for the third time, the ignition timing of the first to fourth cylinders 46, 46, 46, 46 further retards by the retard angle transition amount DIGCRZR. Accordingly, the advance angle amounts IGCRZ1 to IGCRZ4 of the first to fourth cylinders 46, 46, 46, 46 become equal to the advance angle target amounts IGCRZM1 to IGCRZM4−(retard angle transition amount DIGCRZR×3), and the ignition timing of the first cylinder 46 changes from the ignition timing t'11 to an ignition timing t'10; the ignition timing of the second cylinder 46 changes from the ignition timing t'21 to an ignition timing t'20; the ignition timing of the third cylinder 46 changes from the ignition timing t'31 to an ignition timing t'30; and the ignition timing of the fourth cylinder 46 changes from the ignition timing t'41 to an ignition timing t'40.

However, since the advance angle amount IGCRZ1 of the first cylinder 46 is equal to or smaller than 0 (on the retard angle side with respect to the torque-valuing ignition timing t10), the advance angle amount IGCRZ1 of the first cylinder 46 is limited to 0. Consequently, the ignition timing of the first cylinder 46 becomes the torque-valuing ignition timing t10.

Further, since the advance angle amount IGCRZ2 of the second cylinder 46 is equal to or smaller than 0 (on the retard angle side with respect to the torque-valuing ignition timing t20), the advance angle amount IGCRZ2 of the second cylinder 46 is limited to 0. Accordingly, the ignition timing of the first cylinder 46 becomes the torque-valuing ignition timing t20.

Further, since the advance angle amount IGCRZ3 of the third cylinder 46 is equal to or smaller than 0 (on the retard angle side with respect to the torque-valuing ignition timing t30), the advance angle amount IGCRZ3 of the third cylinder 46 is limited to 0. As a result, the ignition timing of the third cylinder 46 becomes the torque-valuing ignition timing t30.

Further, since the advance angle amount IGCRZ4 of the fourth cylinder 46 is equal to or smaller than 0 (on the retard angle side with respect to the torque-valuing ignition timing t40), the advance angle amount IGCRZ4 of the fourth cylinder 46 is limited to 0. Therefore, the ignition timing of the fourth cylinder 46 becomes the torque-valuing ignition timing t40.

In this manner, when the ignition timings of the cylinders 46, 46, 46, 46 are retarded by the retard angle transition amount DIGCRZR every time the fixed cycle elapses, if the advance angle amounts IGCRZ1 to IGCRZ4 of the cylinders 46, 46, 46, 46 become equal to or smaller than 0, then the advance angle amounts IGCRZ1 to IGCRZ4 of the cylinders 46, 46, 46, 46 are limited to 0.

According to the illustrative embodiment, as described above, if the running state changes from a state in which acceleration or deceleration is carried out to a cruise state in which none of acceleration and deceleration is carried out, then the ignition timing of the cylinders 46, 46, 46, 46 is advanced stepwise until the torque-valuing ignition timing is advanced to the fuel-conserving ignition timing MBT. Therefore, the output power variation of the cylinders 46, 46, 46, 46 and the engine 22 in a transition state upon changeover from the torque-valuing ignition timing to the fuel-conserving ignition timing MBT is moderated, and the drivability does not degrade. Accordingly, the running state becomes favorable and the ignition timing can be changed without providing a sense of incongruity to the driver.

Since the advance angle target amount map 134 is provided for each of the cylinders 46, 46, 46, 46, even if the deviation between the torque-valuing ignition timing and the fuel-conserving ignition timing MBT is different among the cylinders 46, 46, 46, 46, the ignition timings can be controlled well, and the output power variation of the cylinders 46, 46, 46, 46 and the engine 22 in a transition state is moderated and the drivability does not degrade. As a result, the running state becomes favorable and the ignition timing can be changed without providing a sense of incongruity to the driver.

Since the ignition timing of each of the cylinders 46, 46, 46, 46 is advanced by the advance angle transition amount DIGCRZ in a fixed cycle, the output power variation of the cylinders 46, 46, 46, 46 and the engine 22 in a transition state upon changeover from the torque-valuing ignition timing to the fuel-conserving ignition timing MBT becomes linear.

Further, if the running state changes from a cruise state to a state in which acceleration or deceleration is carried out, then the ignition timing of each of the cylinders 46, 46, 46, 46 is retarded stepwise to return the ignition timing to the torque-valuing ignition timing. Therefore, the output power variation of the cylinders 46, 46, 46, 46 and the engine 22 in a transition state is moderated and the drivability does not degrade. Consequently, the running state becomes favorable and the ignition timing can be changed without providing a sense of incongruity to the driver.

Since the ignition timing of each of the cylinders 46, 46, 46, 46 is retarded by the retard angle transition amount DIGCRZR in a fixed cycle, the output power variation of the cylinders 46, 46, 46, 46 and the engine 22 in a transition state upon changeover from the fuel-conserving ignition timing MBT to the torque-valuing ignition timing becomes linear.

The illustrative embodiment described above may be modified in the following manner.

Modification 1

While, in the embodiment described above, the advance angle target amount map 134 is stored in the storage section 126 for each of the cylinders 46, 46, 46, 46, if the deviation between the torque-valuing ignition timing and the fuel-conserving ignition timing MBT does not differ among the cylinders 46, 46, 46, 46, then only one advance angle target amount map 134 may be stored in the storage section 126. In this instance, the advance angle target amounts IGCRZM1 to IGCRZM4 of the cylinders 46, 46, 46, 46 are acquired from the single advance angle target amount map 134, and the acquired values of the advance angle target amounts IGCRZM1 to IGCRZM4 of the cylinders 46, 46, 46, 46 are equal to each other.

Modification 2

While, in the embodiment described above, the storage section 126 stores the single advance angle transition amount map 136, the advance angle transition amount map 136 may be stored for each of the cylinders 46, 46, 46, 46. Accordingly, the advance angle transition amount DIGCRZ can be made different among the cylinders 46, 46, 46, 46, and the accuracy in correction control of the ignition timing is enhanced.

Further, while the single retard angle transition amount map 138 is stored in the storage section 126, the retard angle transition amount map 138 may be stored for each of the cylinders 46, 46, 46, 46. Accordingly, the retard angle transition amount DIGCRZR can be made different among the cylinders 46, 46, 46, 46, and the accuracy in correction control of the ignition timing is improved.

Modification 3

While, in the embodiment described above, the advance angle target amount map 134 is provided for each of the cylinders 46, 46, 46, 46, the single advance angle target amount map 134 may be provided such that the advance angle target amounts for the cylinders 46, 46, 46, 46 are calculated from the single advance angle target amount map.

Modification 4

While, in the embodiment described above, the single advance angle transition amount map 136 and the single retard angle transition amount map 138 are provided, the advance angle transition amount map 136 and the retard angle transition amount map 138 may be provided for each of the cylinders 46, 46, 46, 46.

Modification 5

Also modes of arbitrary combinations of the modifications 1 to 4 described above may be applicable.

While the present invention has been described in connection with the preferred embodiment thereof, the technical scope of the present invention is not limited to the scope of the description of the embodiment. It is apparent to those skilled in the art that it is possible to apply various alterations and improvements to the embodiment described above. It will be apparent from the claims that also such modes to which such alterations or improvements are applied as just described are included in the technical scope of the present invention.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An ignition timing controlling apparatus for an engine having plural cylinders, said ignition timing controlling apparatus comprising:
    a plurality of sensors which detect characteristics pertaining to operation of the engine and output signals corresponding to detected characteristics multiple times per second; and
    an electronic controller which receives the sensor output signals and is programmed to control ignition timing of the engine based on the detected characteristics, wherein
    the controller includes a storage section which stores an ignition timing map for the engine which includes torque-valuing ignition timings, and stores an advance angle target amount map which includes advance angle target amounts with which the torque-valuing ignition timings are to be changed into fuel-conserving ignition timings,
    the controller also includes an ignition timing correction section which changes the torque-valuing ignition timings obtained from said ignition timing map into the fuel-conserving ignition timings using the advance angle target amounts from the advance angle target amount map when the controller determines, based on the change amount of the throttle opening, that a running state of a vehicle is in a cruise state in which little acceleration or deceleration is included,
    said ignition timing correction section calculates an advance angle target amount for each of the cylinders of the engine based on said advance angle target amount map and executes advance angle control in which the torque-valuing ignition timing of each of the cylinders is advanced incrementally stepwise to the fuel-conserving ignition timing of each of the cylinders based on the advance angle target amount for each of the cylinders, and
    the ignition timing correction section incrementally advances the ignition timing for each of the cylinders stepwise by an advance angle transition amount in a fixed cycle multiple times per second until the fuel-conserving ignition timing is attained for each of the cylinders, and as the ignition timing for each cylinder is advanced stepwise, a fuel injection amount is correspondingly decreased stepwise.

2. An ignition timing controlling apparatus for an engine according to claim 1, wherein the advance angle control by said ignition timing correction section advances the torque-valuing ignition timing for each of the cylinders by an advance angle transition amount every time said fixed cycle elapses, and when the advance angle transition amount of each of the cylinders is to exceed the advance angle target amount, said ignition timing correction section limits the advance angle transition amount for each of the cylinders to the advance angle target amount.

3. An ignition timing controlling apparatus for an engine according to claim 1, wherein when the controller determines that the running state of the vehicle is taken out of the cruise state of the vehicle, said ignition timing correction section retards the ignition timing for each of the cylinders of the engine incrementally stepwise every time said fixed cycle elapses to return the ignition timing to the torque-valuing ignition timing.

4. An ignition timing controlling apparatus for an engine according to claim 2, wherein when the controller determines that the running state of the vehicle is taken out of the cruise state of the vehicle, said ignition timing correction section retards the ignition timing for each of the cylinders of the engine incrementally stepwise every time said fixed cycle elapses to return the ignition timing to the torque-valuing ignition timing.

5. An ignition timing controlling apparatus for an engine according to claim 3, wherein the returning control by said ignition timing correction section retards the ignition timing for each of the cylinders incrementally stepwise by a retard angle transition amount every time said fixed cycle elapses until the ignition timing for each of the cylinders is returned to the torque-valuing ignition timing.

6. The ignition timing controlling apparatus for an engine according to claim 1, wherein the advance angle transition amount and a retard angle transition amount are predetermined based on engine speed and stored in the storage section of the controller.

7. An ignition timing controlling apparatus for an engine according to claim 2, wherein the advance angle transition amount and a retard angle transition amount are predetermined based on engine speed and stored in the storage section of the controller.

8. An ignition timing controlling apparatus for an engine according to claim 5, wherein the advance angle transition amount and the retard angle transition amount are predetermined based on engine speed and stored in the storage section of the controller.

9. An ignition timing controlling apparatus for an engine according to claim 6, wherein the advance angle transition amount and the retard angle transition amount are set so as to increase as the engine speed increases.

10. An ignition timing control apparatus for an engine according to claim 1, wherein the advance angle target amounts are defined based on throttle opening and engine speed.

11. A vehicle comprising;
an engine having a plurality of cylinders;
a plurality of sensors which detect characteristics pertaining to operation of the engine and output signals corresponding to detected characteristics multiple times per second; and
an electronic controller which receives the sensor output signals and is programmed to control ignition timing of the engine based on the detected characteristics, wherein
the controller includes a storage section which stores an ignition timing map for the engine which includes torque-valuing ignition timings, and which stores an advance angle target amount map which includes advance angle target amounts with which the torque-valuing ignition timings are to be changed into fuel-conserving ignition timings;
the controller also includes an ignition timing correction section which changes the torque-valuing ignition timings obtained from said ignition timing map into fuel-conserving ignition timings using the advance angle target amounts from the advance angle target amount map when the controller determines, based on the change amount of the throttle opening, that a running state of a vehicle is in a cruise state in which little acceleration or deceleration is included,
said ignition timing correction section calculates an advance angle target amount for each of the cylinders of the engine based on said advance angle target amount map and executes advance angle control in which the torque-valuing ignition timing of each of the cylinders is advanced incrementally stepwise to a fuel-conserving ignition timing of each of the cylinders based on the advance angle target amount for each of the cylinders, and as the ignition timing for each cylinder is advanced stepwise, a fuel injection amount is correspondingly decreased stepwise.

12. A vehicle according to claim 11, wherein said ignition timing correction section incrementally advances the ignition timing for each of the cylinders stepwise by an advance angle transition amount in a fixed cycle multiple times per second until the torque-valuing ignition timing for each of the cylinders is advanced by the advance angle target amount for each of the cylinders, thereby attaining the fuel-conserving ignition timing for each of the cylinders.

13. A vehicle according to claim 12, wherein said ignition timing correction section advances the torque-valuing ignition timing for each of the cylinders by the advance angle transition amount every time said fixed cycle elapses, and when the advance angle transition amount of each of the cylinders is to exceed the advance angle target amount, said ignition timing correction section limits the advance angle transition amount for each of the cylinders to the advance angle target amount.

14. A vehicle according to claim 11, wherein when the controller determines that the running state of the vehicle is taken out of the cruise state of the vehicle, said ignition timing correction section retards the ignition timing for each of the cylinders of the engine incrementally stepwise every time said fixed cycle elapses to return the ignition timing to the torque-valuing ignition timing.

15. A vehicle according to claim 12, wherein the advance angle transition amount is predetermined based on engine speed and stored in the storage section of the controller.

16. An ignition timing controlling apparatus for an engine having multiple cylinders, said ignition timing controlling apparatus comprising:
a plurality of sensors which detect characteristics pertaining to operation of the engine and output signals corresponding to detected characteristics multiple times per second, including a throttle opening sensor for detecting opening of a throttle operatively connected to the engine, a throttle valve opening sensor for detecting opening of throttle valves of the engine, a water temperature sensor for detecting the temperature of cooling water of the engine, an oil temperature sensor for detecting the temperature of lubricating oil of the engine, a rotary speed sensor for detecting the rotary speed of a crankshaft of the engine, a gear position sensor for detecting the currently connected gear stage, and a vehicle speed sensor for detecting a vehicle speed of a vehicle on which the engine is provided;
an ignition timing controller which receives the signals from said plurality of sensors and is programmed to control ignition timing of the engine based on the detected characteristics, wherein
the controller includes a storage section which stores an ignition timing map having torque-valuing ignition timings for the engine, and stores an advance angle transition amount map having advance angle target amounts for changing torque-valuing ignition timings to fuel-conserving ignition timings for the engine;
the controller also includes an ignition timing correction section which changes the torque-valuing ignition timings obtained from said ignition timing map into fuel-conserving ignition timings using the advance angle target amounts from the advance angle target amount map when the controller determines, based on the change amount of the throttle opening, that a running state of the vehicle is in a cruise state in which little acceleration or deceleration is included, and said ignition timing correction unit calculates an advance angle target amount for each of cylinders of the engine based on said advance angle target amount map when the running state of a vehicle is in a cruise state, and executes advance angle control in which the torque-valuing ignition timing of each of the cylinders is advanced incrementally stepwise to a fuel-conserving ignition timing of each of the cylinders based on the advance angle target amount for each of the cylinders, and as the ignition timing for each cylinder is advanced stepwise, a fuel injection amount is correspondingly decreased stepwise.

17. An ignition timing controlling apparatus for an engine according to claim 16, wherein the advance angle control by said ignition timing correction section advances the torque-valuing ignition timing for each of the cylinders by an advance angle transition amount every time in a fixed cycle multiple times per second until the torque-valuing ignition timing for each of the cylinders is advanced by the advance angle target amount for each of the cylinders to thereby attain the fuel-conserving ignition timing for each of the cylinders, and if the advance angle transition amount of each of the cylinders is to exceed the advance angle target amount, the ignition timing correction section limits the advance angle transition amount for each of the cylinders to the advance angle target amount.

18. An ignition timing controlling apparatus for an engine according to claim 16, wherein when the controller determines that the running state of the vehicle is taken out of the cruise state of the vehicle, said ignition timing correction section retards the ignition timing for each of the cylinders of the engine incrementally stepwise by a retard angle transition amount every time said fixed cycle elapses to return the ignition timing to the torque-valuing ignition timing.

* * * * *